Figure 1:
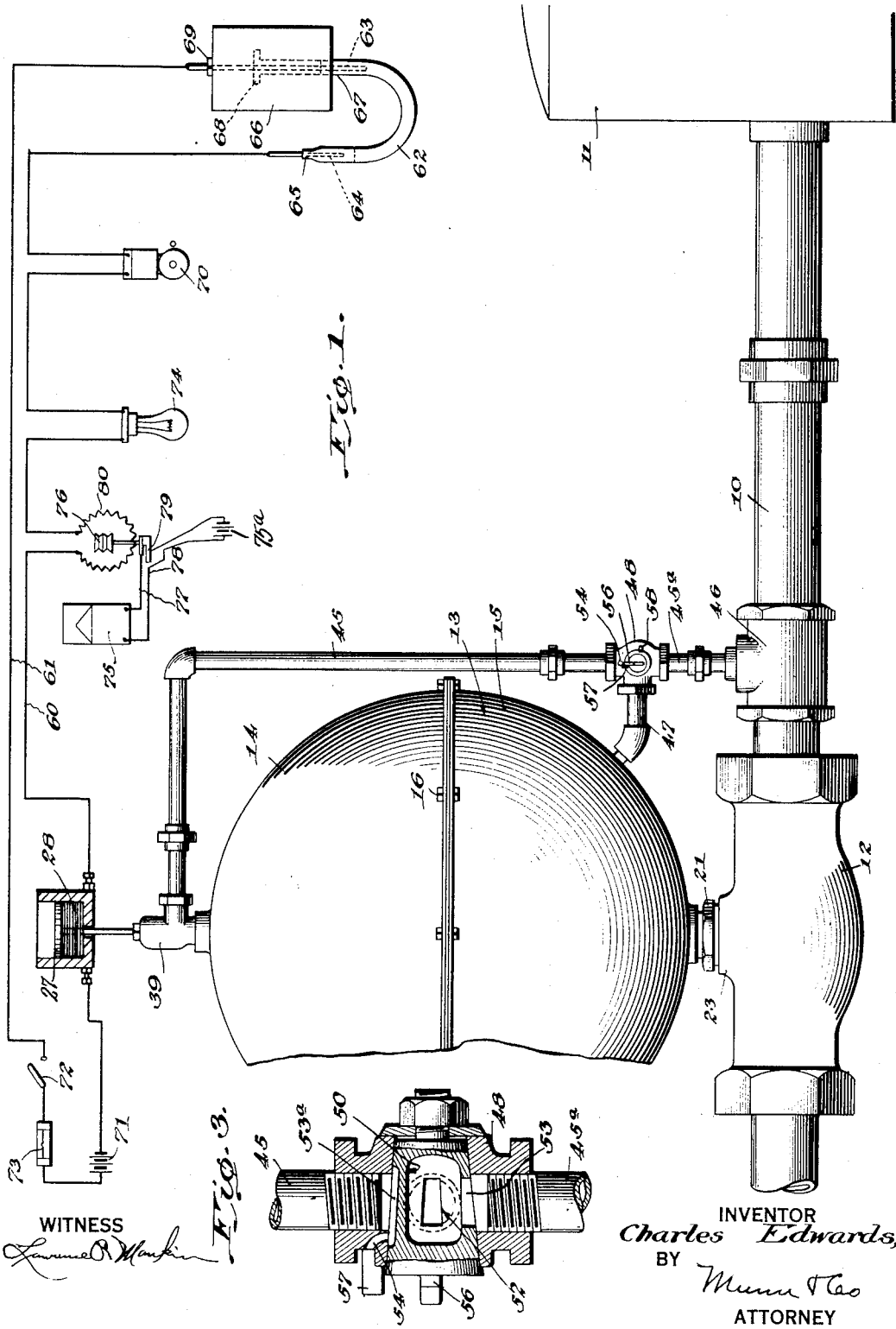

Dec. 19, 1933.   C. EDWARDS   1,940,346
DEVICE FOR CONTROLLING THE FLOW OF GAS IN GAS LINES
Filed June 20, 1932   2 Sheets-Sheet 1

Dec. 19, 1933.     C. EDWARDS     1,940,346
DEVICE FOR CONTROLLING THE FLOW OF GAS IN GAS LINES
Filed June 20, 1932     2 Sheets-Sheet 2

INVENTOR
Charles Edwards,
BY
ATTORNEY

Patented Dec. 19, 1933

1,940,346

UNITED STATES PATENT OFFICE 1,940,346

DEVICE FOR CONTROLLING THE FLOW OF GAS IN GAS LINES

Charles Edwards, Cedar Grove, W. Va.

Application June 20, 1932. Serial No. 618,386

9 Claims. (Cl. 67—113)

This invention relates to a device adapted to control the flow of gas in gas lines.

An object of the invention is the provision of a device which will automatically cut off the flow of gas when there is a leakage, instrumentalities being employed for warning persons in the house that gas is leaking and including means for warning the fire department or other public officials when the conditions are not recognized by persons within the building.

Another object of the invention is the provision of a device for cutting off the flow of gas in the gas supply lines and includes a valve which is normally maintained in open position by the normal pressure in the gas supply line but which will be closed when there is a rupture in the gas supply line with the consequent reduction in the pressure of the gas, an electrical system being employed in connection with the valve for causing closing of the valve through the instrumentalities for closing of the circuit by escaping gas.

A further object of the invention is the provision of a device for cutting off the gas in a gas supply line in which a container is employed provided with a diaphragm dividing the container into two compartments, a manually operated valve being employed for supplying gas directly from the conduit to either of the compartments for moving the diaphragm in opposite directions for controlling closing or opening of the valve, one of the compartments being connected with a supply line for maintaining a predetermined pressure in said compartment for causing the diaphragm to move the valve to open position, a reduction of pressure in the supply line permitting the diaphragm to close the valve.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 2:
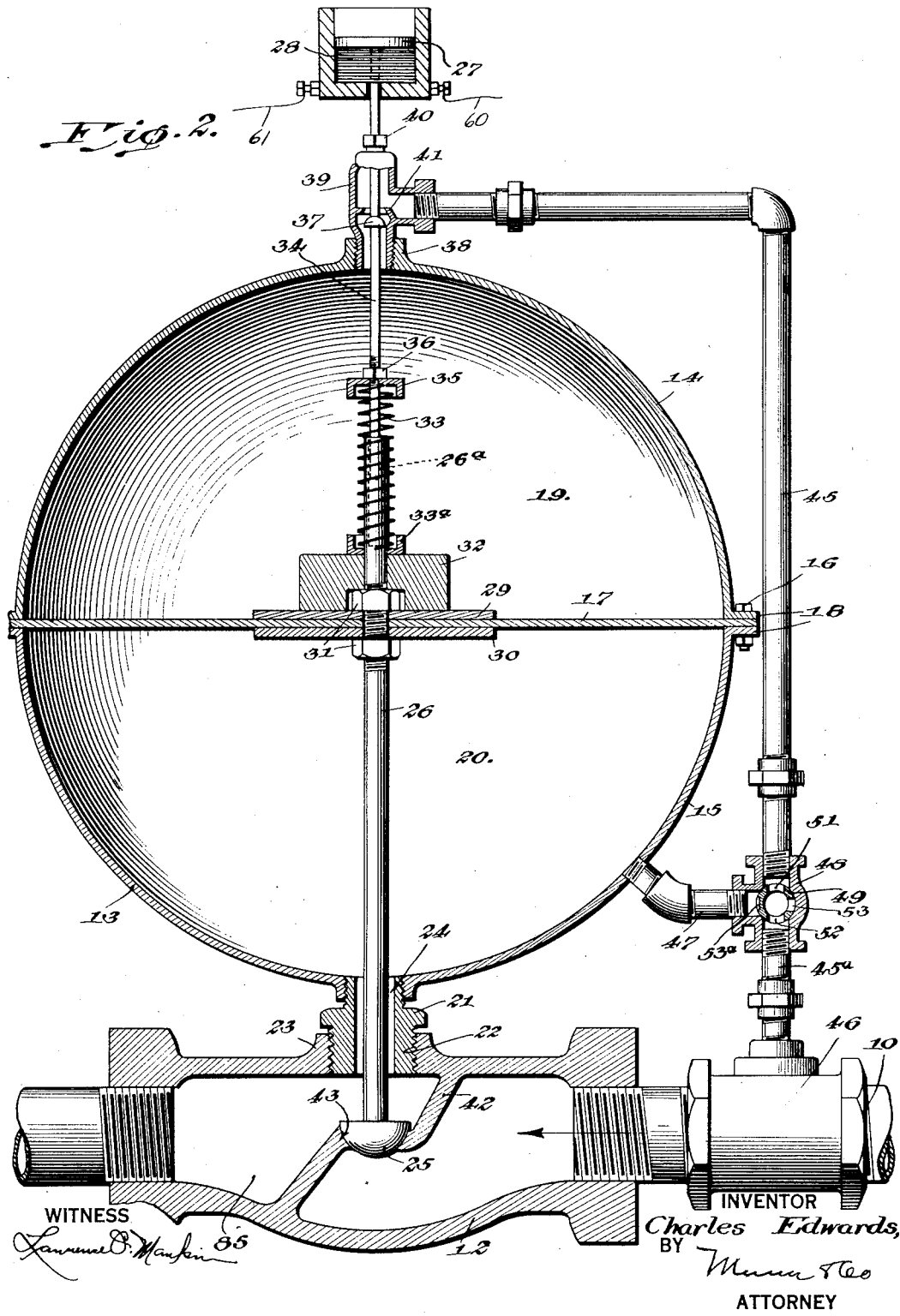

In the drawings:

Figure 1 shows more or less diagrammatically an arrangement for controlling the flow of gas to a supply line, Figure 2 is a vertical section of the direct control for cutting off the supply of gas through a supply conduit, and Figure 3 is a vertical section of the manually controlled valve.

Referring more particularly to the drawings, 10 designates a gas supply conduit which is connected to a meter 11 and a valve casing 12. The gas flows through the conduit in the direction indicated by the arrow in Figure 2.

A container or casing 13 is located adjacent the valve casing 12 and is formed of two sections 14 and 15 which are connected together by bolts 16. A diaphragm 17 is clamped between the flanges 18 at the peripheries of the sections 14 and 15 and divides the container 13 into a pair of compartments 19 and 20. A plug 21 is threaded into an opening 22 in a boss 23 formed at the upper portion of the valve casing 12. This plug is provided with a passage 24 which connects the compartment 20 with the interior of the valve casing 12 and adjacent to and at one side of a valve 25.

A stem 26 extends vertically through the casing 13 and is connected to the valve 25 at its lower end and at the upper end to the diaphragm 17 by means of washers 29 and 30 and nuts 31.

A weight 32 is received by the hollow stem portion 26ª and rests upon the washer 29. This weight is of sufficient capacity to cause the diaphragm 17 to be moved to its lowermost position when the gas pressure in the compartment 20 is reduced sufficiently to permit the return of the diaphragm to its normal horizontal position.

A spring 33 embraces the stem portion 26ª above the weight 32 and has its lower end seated within a cup-shaped member 33ª supported by the weight 32. The upper end of the spring is received by a cup-shaped member 35 maintained in position on a stem 34 by means of a nut 36 which is threaded thereon. The spring 33 tends to move the stem 34 upwardly for closing a valve 37 when the diaphragm is moved upwardly and the valve 25 is opened. The lower end of the stem 34 is slidably received by the hollow stem portion or sleeve 26ª.

A nipple 38 is formed at the upper end of the container 13 into which is screwed a valve casing 39. The stem 34 passes through the casing 39 and the usual packing 40 is formed at the outer end of the casing 39 to prevent leaking of fluid from said casing. A valve 37 engages a seat 41 formed in the casing 39. An armature 27 of a solenoid 28 is secured to the outwardly projecting end of the stem 34.

A partition 42 is formed in the valve casing 12 and is provided with an opening 43 and the walls of this opening are shaped to provide a seat for the valve 25.

A by-pass 45 connects a valve casing 48 with the valve casing 39. A T-joint 46 is provided in the conduit 10 and a pipe 45ᵃ connects this joint with the valve casing 48.

A branch pipe 47 connects the valve casing 48 with the compartment 20. A valve 49 is located within the casing 48 and is adapted to be manually operated for automatically controlling the flow of gas from the conduit 10 to either the chamber 20 or to the branch pipe 45 and likewise the compartment 19 when the valve 37 is in open position. The valve 49 is adapted to normally place the branch pipe 45 in communication with the conduit 10, while at starting position the valve 49 is adapted to place the conduit 10 through the branch pipe 47 in communication with the lower compartment 20 of the container 13. In this last position any gas in chamber 19 will be drained to the atmosphere.

The valve 49 has a central chamber 50 and diametrically disposed ports 51 and 52 which when alined with the pipes 45 and 45ᵃ will place the main supply pipe 10 in communication with the pipe 45 and thereby supply gas to the chamber 19.

The valve has a third port 53 which is adapted to be alined with pipe 45ᵃ when the port 52 is alined with the pipe 47 so that gas from the conduit 10 will be supplied directly to chamber 20 while being cut off from the chamber 19.

The valve 49 has a groove 53ᵃ diametrically opposite the port 53 so that when said port 53 is alined with the pipe 45ᵃ the groove will be alined with pipe 45 as shown in Fig. 3. A passage 54 is formed in the casing 48 and extends from one end of the groove 53ᵃ to the atmosphere so that gas from the chamber 19 and pipe 45 will be drained to the atmosphere during starting of the device as shown in Fig. 3. The inner end of the passage 54 is located sufficiently beyond the confines of pipe 45 so that when the valve is in the position shown in Fig. 2 gas will not leak to the atmosphere. In other words, the port 51 is not sufficiently extensive to embrace the inner end of the passage 54.

The valve 49 is adapted to be operated by a handle (not shown). A finger 56 projects from the valve and is adapted to engage either a lug 57 or a lug 58, thereby properly positioning the valve in its two operative positions. A lug 57 controls the normal working position as shown in Figure 2 while lug 58 controls the starting position of the valve.

The stem 34 may be reciprocated by means of the armature 27 of the solenoid 28 by a circuit generally designated by the wires 60 and 61. A mercurial switch is included in the circuit and is shown more particularly in the U-shaped member 62 in Fig. 1. The U-shaped member 62 is in the form of a glass tube which is adapted to contain a predetermined quantity of mercury so that the mercury in one leg of the U tube 62 will be in contact with a conducting element 63 of the wire 61 while the mercury in the other leg of the U tube will be spaced from the contact 64 which projects into said leg of the U tube. The outer end of the U tube containing the contact 64 is sealed to the wire 60, as shown at 65.

An unglazed porcelain container 66 receives one leg 67 of the U tube 62 and the upper end 68 of this leg is open to the interior of the porcelain container 66 so that a change of pressure within the container 66 will be transmitted to the mercury in the leg 67 which will decrease the height of the level of the mercury in said leg while forcing the mercury upwardly in the other leg until it engages the contact 64 and thereby closes the circuit to the solenoid 28. The walls of the container 66 are porous so that gas escaping from the conduit 10 or any of the associated conduits when surrounding the porous container 66 will pass through the porous container and increase the pressure in said container. It will be noted that the wire 61 continues through the upper end of the container 66 and the opening through which the wire passes is sealed, as shown at 69.

The container 66, which is of porous material, may contain air so that the mercury in the U-tube 62 will be out of contact with the member 64. If gas escapes from any of the pipes beyond the valve 12, this gas will enter the porous container as is well known and thereby create a pressure in the container which, being in all directions, will exert a pressure upon the mercury in the open end portion of the leg 63 of the U-tube 62 so that the mercury in the other leg will be forced upwardly until it contacts with the member 64 whence the circuits to the various alarms or control means have been closed.

An alarm in the form of a bell is shown at 70 and is in circuit with the wires 60 and 61 and a battery 71. A switch 72 is normally closed when the device is inoperative. A fuse 73 is included in the circuit and is adapted to be broken when the current rises above a maximum.

A lamp 74 is also included in the circuit of the wires 60 and 61 and is adapted to be illuminated when the circuit is closed by the movement of the mercury in the U tube 62. The bell 70 and the light 74 are adapted to warn occupants of a building that gas is escaping and has caused closing of the circuit through the mercury in the U tube 62.

If, for any reason, the occupants of the house are away or unable to take care of the unusual condition of a gas discharge officials outside of the building, such as the fire department, will be notified through the ringing of an alarm indicated at 75. This alarm is operated by means of a thermostat 76 which closes a circuit including the wires 77 and 78 through a switch 79. A resistance wire 80 embraces the thermostat 76 so that when the current passing through the wires 60 and 61 has caused sufficient heat to affect the thermostat a switch 79 is closed, thereby warning the officials that some unusual condition has occurred in the building from which the signals have been received. It will be appreciated that in case of a fire the thermostat 76 will likewise be operated for warning the officials through the alarm 75. A battery 75ᵃ is included in the circuit with the wires 77 and 78.

The operation of my device is as follows: In order to open the valve 25 or raise it from its seat, the operator rotates the valve 49 in Fig. 2 a half turn, thereby permitting gas from the conduit 10 to pass through the branch pipe 47 and enter the chamber 20. When sufficient pressure is built up in the compartment 20 the diaphragm 17 will be raised, thereby raising the valve 25 and causing the valve 37 to engage its seat 41, thus closing the by-pass 45 to the compartment 19.

The valve 49 is then turned backwardly a half turn so that the branch pipe 47 will be cut off from communication with the compartment 20 and the by-pass 45 will be in communication with the conduit 10 so that gas will fill the by-pass up to the point where the valve 37 cuts off the by-pass to the compartment 19.

Since gas is flowing in the direction indicated by the arrow in Fig. 2, it passes beyond the valve 25 into a chamber 85 of the casing 12 and this gas will also pass through the opening 24 to maintain the diaphragm 17 in its uppermost position for maintaining the valve 25 open and the valve 37 closed. The spring 33 tends at all times to maintain the stem 34 upwardly for retaining the valve 37 in closed position when the gas in chamber 20 retains the diaphragm upwardly.

If gas should escape from the conduit 10 or from some of its connections and enter the room of a building where the porous container 66 is located, the gas will pass through the porous wall, enter the interior of the container 66 and thereby create pressure in said container which will cause the mercury in the leg 67 of the U tube 62 to descend while causing it to ascend in the other leg of the U tube. As soon as the mercury engages the contact 64 the circuit, including the wires 60 and 61, will be closed so that the alarm 70 will be energized and the lamp 74 illuminated. If the occupants of the building fail to take the necessary precautions to stop the leakage, and to open the switch 72 and break the circuit, the member 80 will be heated sufficiently in due course to cause the thermostat 76 to operate the switch 79 whence the alarm 75 will be given to the proper authorities. Since the circuit is closed the armature 27 will be drawn downwardly by the energized solenoid 28, causing the stem 34 to be lowered, whereby the valve 37 will be removed from its seat 41, thus opening the by-pass 45 to the chamber 19 so that the gas from the container will pass into the chamber 19. The gas pressure will be equalized upon opposite sides of the diaphragm so that the weight 32 will move the diaphragm 17 to a planar position and thus close the valve 25.

When it is desired to reset the device after the trouble has been eliminated the switch 72 is opened, thereby eliminating the solenoid from affecting the valve 37. The valve 49 is then manually operated to the position shown in Fig. 3 to permit gas from the container 10 to flow through the branch pipe 47 into the compartment 20. At this time gas from the chamber 19 and pipe 45 will drain to the atmosphere through the passage 54 with which the groove 53ᵃ is aligned. Sufficient pressure in the compartment 20 will cause the diaphragm 17 to be elevated, thereby opening the valve 25. When it is found that gas is flowing valve 49 is then moved to its normal position shown in Fig. 2 so that gas from the conduit 10 will fill the by-pass 45 up to the valve 37 which will be returned to its seat 41 by the spring 33.

I claim:

1. A device for controlling the flow of gas in gas lines comprising an airtight container, a diaphragm dividing the container into two compartments, a conduit for gas, a by-pass connecting the conduit with one compartment, a branch pipe connecting the second compartment with the by-pass, a valve at the connection between the by-pass and the branch pipe for controlling the flow alternately through the branch pipe and the by-pass, a control valve for cutting off the flow of gas through the conduit when the pressure is lowered sufficiently in said conduit and having a stem connected to the diaphragm and actuated thereby to open position when the gas pressure is lowered in the conduit and likewise in the second compartment, the conduit being in communication with a second compartment, and means for moving the diaphragm to close the control valve during reduced pressure in the conduit.

2. A device for controlling the flow of gas in gas lines comprising an airtight container, a diaphragm dividing the container into two compartments, a conduit for gas, a by-pass connecting the conduit with one compartment, a branch pipe connecting the second compartment with the by-pass, a valve at the connection between the by-pass and the branch pipe and controlling the flow alternately through the branch pipe and the by-pass, a control valve for cutting off the flow of gas through the conduit when the pressure is lowered sufficiently in said conduit, a stem connected between the control valve and the diaphragm and actuated by the diaphragm to open position when the gas pressure is lowered in the conduit and likewise in the second compartment, the conduit being in communication with a second compartment, means for moving the diaphragm to close the control valve during reduced pressure in the conduit, a second valve connected to the stem and adapted to cut off communication between the by-pass and the first-mentioned compartment, and means for aiding in maintaining the second valve closed when the control valve is open.

3. A device for controlling the flow of gas in gas lines comprising an airtight container, a diaphragm dividing the container into two compartments, a conduit for gas, a by-pass connecting the conduit with one compartment, a valve for controlling the flow of gas from a branch pipe to said compartment, a branch pipe connecting the second compartment with the by-pass, a valve at the connection between the by-pass and the branch pipe for controlling the flow alternately through the branch pipe and the by-pass, a control valve for cutting off the flow of gas through the conduit when the pressure is lowered sufficiently in said conduit and having a stem connected to the diaphragm and actuated thereby to open position when the gas pressure is lowered in the conduit and likewise in the second compartment, means for moving the diaphragm to close the control valve during reduced pressure in the conduit, an open circuit, a solenoid included in said circuit for moving the first mentioned valve to closed position, and means for causing closing of the circuit when gas escaping from the conduit comes into contact with said last-mentioned means.

4. A device for controlling the flow of gas in gas lines comprising a container, a diaphragm dividing the container into two compartments, a supply conduit for gas, a by-pass connecting the conduit with one compartment, a branch pipe connecting the second compartment with the by-pass, a valve at the connection between the by-pass and the branch pipe for controlling the flow of gas from the conduit alternately to the second-mentioned compartment and the first-mentioned compartment, a control valve in the conduit for cutting off the flow of gas through the conduit and connected to the diaphragm, said valve being normally maintained in open position by the pressure of the gas in the second compartment on the diaphragm, the second compartment being in direct communication with the conduit adjacent the valve for maintaining a maximum gas pressure in the second compartment when the control valve is open and means for moving the diaphragm to close the control valve when the pressure is reduced in the supply conduit.

5. A device for controlling the flow of gas in gas lines comprising a container, a diaphragm dividing the container into two compartments, a supply conduit for gas, a by-pass connecting the conduit with one compartment, a branch pipe connecting the second compartment with the by-pass, a valve at the connection between the by-pass and the branch pipe for controlling the flow of gas from the conduit alternately to the second-mentioned compartment and the first-mentioned compartment, a control valve in the conduit for cutting off the flow of gas through the conduit and connected to the diaphragm, said valve being normally maintained in open position by the pressure of the gas in the second compartment on the diaphragm, the second compartment being in direct communication with the conduit adjacent the valve for maintaining a maximum gas pressure in the second compartment when the control valve is open, means for moving the diaphragm to close the control valve when the pressure is reduced in the supply conduit, a second valve connected with the diaphragm and adapted to close the by-pass to the first-mentioned compartment when the control valve is open and adapted to open the by-pass to said compartment when the control valve is closed for delivering the gas pressure of the supply conduit to said compartment and for causing the diaphragm to retain the control valve closed.

6. A device for controlling the flow of gas in gas lines comprising a container, a diaphragm dividing the container into two compartments, a supply conduit for gas, a by-pass connecting the conduit with one compartment, a valve for controlling the flow of gas from the by-pass to said compartment, a branch pipe connecting the second compartment with the by-pass, a valve at the connection between the by-pass and the branch pipe for controlling the flow of gas from the conduit alternately to the second-mentioned compartment and the first-mentioned compartment, a control valve in the conduit for cutting off the flow of gas through the conduit and connected to the diaphragm, said valve being normally maintained in open position by the pressure of the gas in the second compartment on the diaphragm, the second compartment being in direct communication with the conduit adjacent the valve for maintaining a maximum gas pressure in the second compartment when the control valve is open, means for moving the diaphragm to close the control valve when the pressure is reduced in the supply conduit, an open circuit, a solenoid in said circuit, an armature actuated by said solenoid and connected to the first-mentioned valve for causing closing of the valve when the solenoid is energized, a switch for closing the circuit, and means affected by escaping gas for causing closing of the switch.

7. A device for controlling the flow of gas through gas lines comprising a control valve in the line adapted to cut off the flow of gas through the line when the pressure of the gas flow falls below a predetermined degree, a diaphragm affected at one side thereof by the gas pressure in the line for retaining the valve normally open, means for causing the gas pressure in the line to act on the other side of the diaphragm to permit closing of the control valve, the last-mentioned means including a valve, an open circuit, a solenoid included in the circuit for causing opening of the second-mentioned valve when the circuit is closed, means for closing the circuit and including an air-tight container having its walls formed of porous materials, a U tube having one leg opening into the interior of said container, a contact in the circuit and projecting in said leg of the U tube, a second contact projecting into the other leg of the U tube, the last-mentioned leg having its end sealed to the atmosphere, a liquid in the U tube engaging the first-mentioned contact, gas escaping from the lines adapted to enter the porous walls of the container and create a pressure on the liquid in the U tube and cause said liquid to close the circuit when said liquid engages both contacts.

8. A device for controlling the flow of gas through gas lines comprising a control valve in the line adapted to cut off the flow of gas through the line when the pressure of the gas flow falls below a predetermined degree, a diaphragm affected at one side thereof by the gas pressure in the line for retaining the valve normally open, means for causing the gas pressure in the line to act on the other side of the diaphragm to permit closing of the control valve, the last-mentioned means including a valve, an open circuit, a solenoid included in the circuit for causing opening of the second-mentioned valve when the circuit is closed, means for closing the circuit and including an air-tight container having its walls formed of porous materials, a U tube having one leg opening into the interior of said container, a contact in the circuit and projecting in said leg of the U tube, a second contact projecting into the other leg of the U tube, the last-mentioned leg having its end sealed to the atmosphere, a liquid in the U tube engaging the first-mentioned contact, gas escaping from the lines adapted to enter the porous walls of the container and create a pressure on the liquid in the U tube and cause said liquid to close the circuit when said liquid engages both contacts, and an alarm included in the circuit.

9. A device for controlling the flow of gas through gas lines comprising a control valve in the line adapted to cut off the flow of gas through the line when the pressure of the gas flow falls below a predetermined degree, a diaphragm affected at one side thereof by the gas pressure in the line for retaining the valve normally open, means for causing the gas pressure in the line to act on the other side of the diaphragm to permit closing of the control valve, the last-mentioned means including a valve, an open circuit, a solenoid included in the circuit for causing opening of the second-mentioned valve when the circuit is closed, means for closing the circuit and including an air-tight container having its walls formed of porous materials, a U tube having one leg opening into the interior of said container, a contact in the circuit and projecting in said leg of the U tube, a second contact projecting into the other leg of the U tube, the last-mentioned leg having its end sealed to the atmosphere, a liquid in the U tube engaging the first-mentioned contact, gas escaping from the lines adapted to enter the porous walls of the container and create a pressure on the liquid in the U tube and cause said liquid to close the circuit when said liquid engages both contacts, a second circuit including an alarm remote from the valve, a heating means included in the first-mentioned circuit, a thermostat operatively associated with the heating means, a switch in the second circuit and operated by the thermostat for closing said circuit.

CHARLES EDWARDS.